US011671453B2

(12) United States Patent
Lamb et al.

(10) Patent No.: US 11,671,453 B2
(45) Date of Patent: Jun. 6, 2023

(54) AUTOMATED LIGHTWEIGHT DATABASE ACCESS PROTOCOL SECURE/MULTIPURPOSE INTERNET MAIL EXTENSIONS KEY SERVER

(71) Applicants: Richard Lamb, Petaluma, CA (US); Fredrik Ljunggren, Asa (SE)

(72) Inventors: Richard Lamb, Petaluma, CA (US); Fredrik Ljunggren, Asa (SE)

( * ) Notice: Subject to any disclaimer, the term of this patent is extended or adjusted under 35 U.S.C. 154(b) by 240 days.

(21) Appl. No.: 17/350,194

(22) Filed: Jun. 17, 2021

(65) Prior Publication Data

US 2022/0407888 A1    Dec. 22, 2022

(51) Int. Cl.
*H04L 9/40* (2022.01)
*G06Q 10/107* (2023.01)
*G06F 16/22* (2019.01)
*G06Q 30/0241* (2023.01)
*H04L 51/48* (2022.01)

(52) U.S. Cl.
CPC ............ *H04L 63/168* (2013.01); *G06F 16/22* (2019.01); *G06Q 10/107* (2013.01); *G06Q 30/0277* (2013.01); *H04L 51/48* (2022.05); *H04L 63/0428* (2013.01); *G06Q 2220/10* (2013.01)

(58) Field of Classification Search
CPC ... H04L 63/168; H04L 63/0428; H04L 51/48; G06F 16/22; G06Q 30/0277; G06Q 10/107
USPC ........................................................ 713/152
See application file for complete search history.

(56) References Cited

U.S. PATENT DOCUMENTS

| | | | | |
|---|---|---|---|---|
| 7,401,356 B2* | 7/2008 | Bandini | .................... | H04L 9/32 713/153 |
| 2005/0257057 A1* | 11/2005 | Ivanov | .................. | H04L 9/3268 713/171 |
| 2007/0130464 A1* | 6/2007 | Swedor | ............... | H04L 63/0442 713/170 |
| 2011/0202756 A1* | 8/2011 | West | .................... | H04L 63/0428 713/152 |
| 2014/0041013 A1* | 2/2014 | Bandini | .............. | H04L 63/0823 726/14 |
| 2017/0272467 A1* | 9/2017 | Osterweil | ........... | H04L 63/0428 |
| 2020/0082738 A1* | 3/2020 | Poeppelmann | .......... | H04L 9/002 |
| 2020/0313886 A1* | 10/2020 | Poeppelmann | ....... | H04L 9/3236 |
| 2021/0204032 A1* | 7/2021 | VanSickel | .......... | H04N 21/4755 |
| 2022/0029824 A1* | 1/2022 | Poeppelmann | ....... | H04L 9/3218 |

* cited by examiner

Primary Examiner — Samson B Lemma

(57) ABSTRACT

A Secure/Multipurpose Internet Mail Extensions (S/MIME) key material publication system that converts cryptographic material extracted from digitally signed and validated S/MIME messages it receives into key material formats suitable for populating email address books. Publication of the address book contents both internal and external to an organization is done using the standard address book lightweight database access protocol (LDAP). The wide availability and coordination of such automated address books distributing key material across the Internet allows the large installed base of S/MIME email clients to immediately send secure encrypted email across organizational boundaries. The system serves the role of public key server thus removing a barrier to ubiquitous secure encrypted email by simplifying global key management.

5 Claims, 3 Drawing Sheets

… (1)

AUTOMATED LIGHTWEIGHT DATABASE ACCESS PROTOCOL SECURE/MULTIPURPOSE INTERNET MAIL EXTENSIONS KEY SERVER

TECHNICAL FIELD

The present invention relates to automated public key distribution to facilitate widespread, cross-organizational encrypted email communication. More particularly, the present invention relates to a system which automatically extracts and converts cryptographic signature material associated with received Secure/Multipurpose Internet Mail Extensions (S/MIME) [1] messages into formats used by the widely deployed lightweight database access protocol (LDAP) [2] used for email address books. By doing so, the present invention instantly allows the large existing installed base of email clients supporting S/MIME and LDAP [3] to exchange secure encrypted email between organizations globally.

DESCRIPTION OF INVENTION

It seems reasonable in today's high-tech environment to assume secure email exchange would be the norm. However, it is not. The vast majority of email still lies un-encrypted on servers and only recently has there even been a push to protect it during transfer between servers [4]. Why?

Encryption technology is relatively mature and widely available. It has even been built into many popular email packages such as Microsoft Outlook for decades. This functionality is based on an interoperable open standard called S/MIME [1]. Turning on this built-in feature ensures messages, whether in transit or lying on intermediate servers, cannot be read by anyone other than the intended recipient.

The reason this feature has not caught on by default lies in the difficulties in key management. Briefly, in order to send an encrypted message to a particular recipient, you need to first have their public key [5]. These keys may first be exchanged between users or looked up on a server. The former may be adequate for occasional individual use but does not scale. The later is commonly deployed at medium to large enterprises to allow for encrypted email exchanges among staff [6]. However, such servers are rarely made available to the general public [7] nor shared with other organizations. Furthermore, the servers [6] only manage public key information for users of a single department or email system and not scalable to multi-departmental enterprises (e.g., Governments) or the general public. The ability to exchange secure email in a widespread fashion is therefore limited. The purpose of the present invention is to remove a barrier to ubiquitous secure email by automating key distribution—reducing it to the simple sending of a single signed email to the present invention for widespread publication.

Referring to FIG. 1. In current S/MIME deployments, when bill@dc.org first attempts to send (100) an encrypted email to kathie@cordlessliving.com using his email client (101), the email client has no information for kathie@cordlessliving.com. Consulting (102) the locally maintained address book (103) also comes up empty (104) since it only contains information on organization B (125) staff. Unable to find key material for kathie@cordlessliving.com, bill@dc.org's email client (101) displays failure. This difficulty is currently overcome by asking kathie@cordlessliving.com to first send a signed message (105) that will contain key information for kathie@cordlessliving.com. When kathie@cordlessliving.com sends a signed message, her email client (106) uses her private key (107-S) to generate the signature. The email client (106) also appends her public key (107-P); a chain of public key-signature pairs called certificates to validate her key; and other information to the outgoing message (108). In S/MIME, the receiver of this email uses the appended signature and chain of certificates to verify the identity of the sender as well as the integrity of the email contents. Organization A's (124) email server (109) forwards the message (110) to the mail server serving dc.org (111) for organization B (125). Email client (101) picks up the signed message (112), validates identity and contents using the appended signature, and displays the message to bill@dc.org (113). Now when bill@dc.org tries to send (100) an encrypted email to kathie@cordlessliving.com in response, his email client (101) has a copy of kathie@cordlessliving.com's public key (107-P) enabling his email client to encrypt his message to kathie@cordlessliving.com so that only she will be able to decrypt with her private key (107-S). Before sending, as part of the separate sending process, email client (101) once again validates kathie@cordlessliving.com's key and identity by following the chain of certificates it received as part of kathie@cordlessliving.com's signature to ensure the result can only be read by her. The encrypted message is sent (114) to organization B's (125) email server (111) which forwards it (115) to the email server for cordlessliving.com (109). kathie@cordlessliving.com's email client (106) picks it up (116) and uses her private key (107-S) to decrypt the message and display (117) it. bill@dc.org must ask for a signed message for every user in organization A or any other user in any other organization before sending a secured encrypted message to that user. Similarly, the users in these organizations must respond with signed messages before they can receive encrypted messages. This two-step process is not only cumbersome but does not scale to anything but a few contacts. The present invention seeks to eliminate this barrier to ubiquitous encrypted email in the hope of making secured email the norm.

In the present invention the address book is replaced with an enhanced server that responds to both external and internal requests; routes internal requests on-the-fly to the correct external address book server; and automatically populates its database by extracting and converting key material from signed messages it receives. In this scenario kathie@cordlessliving.com need only send one signed email (105, 106, 108, 109, 118 in lieu of 110) to this enhanced server (119, 120, 121) where the message is validated; signature, certificates and contents are extracted; and converted to address book format (120) and stored (121). The world can now seamlessly send encrypted email to kathie@cordlessliving.com by querying organization A's address book (121) first. When bill@dc.org sends an encrypted email (100), his email client queries (102) organization B's own enhanced address book server (103) for kathie@cordlessliving.com. The enhanced server finds its counterpart server for cordlessliving.com (121) the same way the email server for cordlessliving.com (109) is found using the Domain Name System (DNS) [8] and forwards the request (122) for kathie@cordlessliving.com's key material. The enhanced address book server functionality could in fact be incorporated alongside the email server (109) thus eliminating the need for the additional DNS lookup. A response (123) with kathie@cordlessliving.com's key material is received and returned (104) to the email client (101) which validates and uses it to encrypt the email message for kathie@cordlessliving.com. This then follows the path (114, 111, 115, 109,116) back to email client (106) where it is decrypted with private key (107-5) and displayed (117). Neither bill@dc.org or anyone else from any other organization implementing the present invention need first exchange signed email with kathie@cordlessliving.com, eliminating path (110), before being able to securely send email to her.

PREFERRED EMBODIMENT

Figure 1:
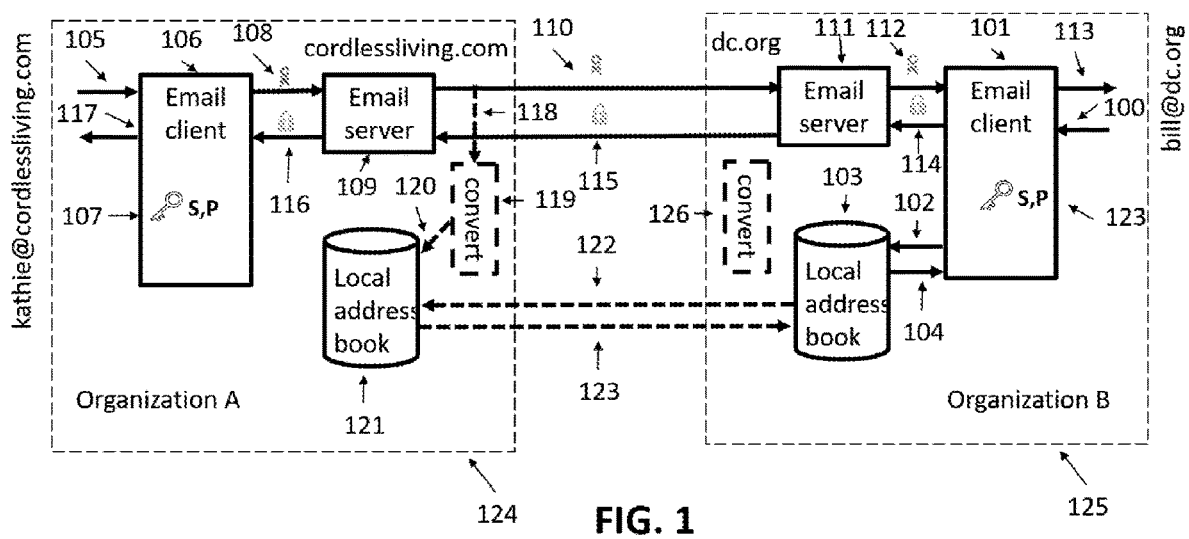
FIG. 1 shows a diagram of current S/MIME operation and additional elements of the present invention as part of an overall system.
Figure 2:
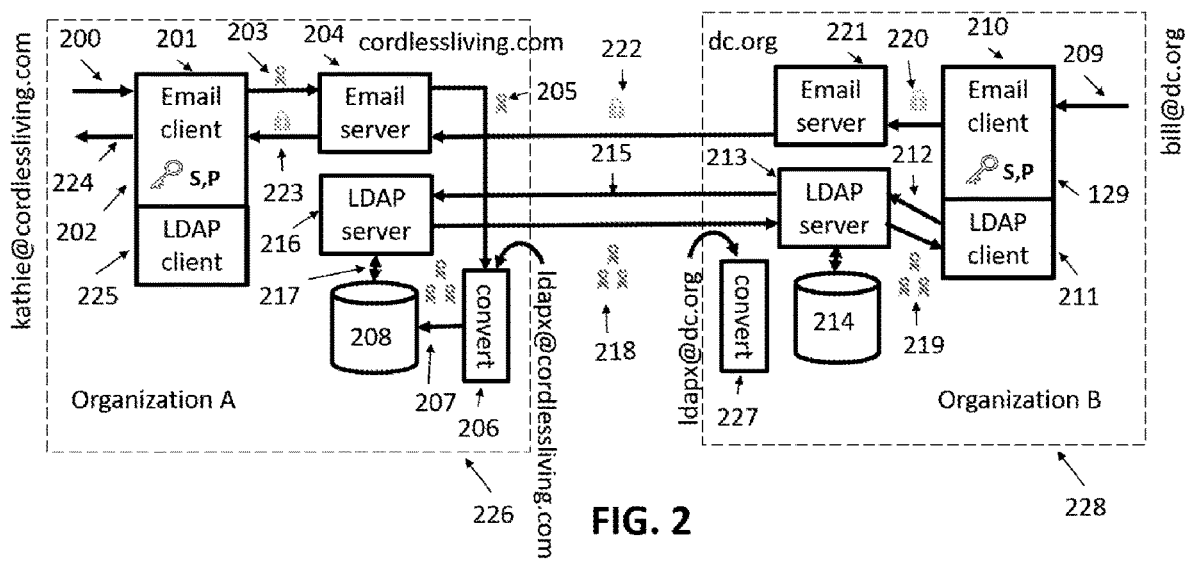
FIG. 2 shows a diagram of a preferred embodiment of the present invention as part of an overall system.

Referring to FIG. 2. The preferred embodiment of the present invention implements the enhanced address book with a LDAP server (213,216) engineered to find and forward requests that cannot be satisfied using local databases (208,214) to the responsible LDAP server (215, 216 for cordlessliving.com). The local LDAP databases (208, 214) are automatically populated with key material converted (206,227) from emails received from inside the organizations.

kathie@cordlessliving.com sends (200) a single signed email to an email address associated with the present invention—ldapx@cordlessliving.com—via email client (201) which uses her private key (202-S) to create a S/MIME signature. S/MIME signatures contain not only a signature of the email content but also a chain of certificates that allow the receiver of such an email to verify the identity and key to a single trusted, usually public, certificate. These trusted certificates are preconfigured and maintained by the operating systems under which servers, clients, and other programs run. The format of the S/MIME signature is defined by PKCS7 [9]. The signed email is sent (203) to organization A's (226) email server (204) which forwards (205) it to a conversion program (206). This program cryptographically validates the email and extracts content and the PKCS7 signature. The conversion program then carefully dissects the signature and reassembles it with the email content to create LDAP compatible attributes for kathie@cordlessliving.com's certificate (containing public key 202-P)—"userCertificate" [10], and the more comprehensive "userSMIMECertificate" [11] containing content and chain of certificates used to validate key and identity to trusted root certificate. These are saved (207) in the database (208). userCertificate takes the binary version of the certificate identifying kathie@cordlessliving.com and her public key from the dissected PKCS7 signature while userSMIMECertificate takes a binary version of a PKCS7 signature reassembled from dissected components and combined with email contents that preserves the validity of the new PKCS7 structure.

Now when bill@dc.org tries to send an encrypted email (209), his email client (210) uses its integrated LDAP client (211) to lookup (212) the public key for kathie@cordlessliving.com (202-P). Since this is not a user in organization B and therefore not found in the local database (214), the LDAP server (213) looks up and queries (215) the LDAP server for cordlessliving.com (216). This server searches (217) its local database (208) and finds the previously populated key material for kathie@cordlessliving.com and returns it (218) to organization B's LDAP server (213) for forwarding (219) to bill@dc.org's LDAP client (211) and email client (210). Email client (210) validates the key material (userSMIMECertificate and userCertificate) by following included certificate chains up to one matching a preconfigured trusted certificate in the email client or operating system. Finally email client (210) uses kathie@cordlessliving.com's public key (202-P) contained in the key material to encrypt the message for her (220). Email server (221) forwards (222) the message to the email server responsible for cordlessliving.com (204) where email client (201) picks up the message (223) and decrypts it with its private key (202-S) for display (224) to kathie@cordlessliving.com.

The preferred embodiment keeps its database of key material up to date by regularly checking the expiration dates that are a native part of certificates stored in the databases (208,214) and notifying the owners of key material of impending expiration (and requesting another signed email to update same) and removing any associated key material that has expired. Each time a new signed email is received, after it has been validated, its converted contents are used to update the database.

In the interest of privacy, the LDAP server of the preferred embodiment does not allow browsing or group lookup of email addresses. It only responds when there is an exact match. This limits the ability of an attacked to see a directory of staff.

Figure 3:
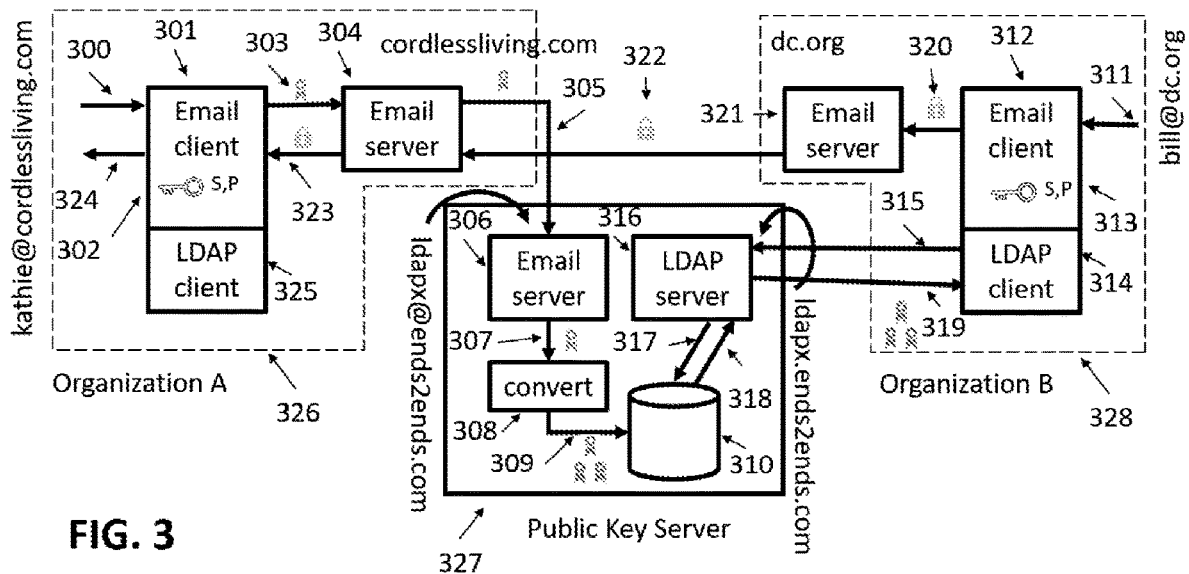
FIG. 3 shows a diagram of an alternate preferred embodiment of the present invention as part of an overall system.

Referring to FIG. 3. In an alternate preferred embodiment, the present invention serves as a public address book (327) for all users and organizations with insufficient resources to maintain their own system. Anyone may configure their LDAP client (314,325) to query (315) this public server (316) at ldapx.ends2ends.com as well as publish their key material by sending signed email (305) to ldapx@ends2ends.com. In this instance the LDAP server (316) may choose to forward requests it receives (315) at ldapx.ends2ends.com for users not in its database (310) to responsible LDAP servers and relay responses or only respond (319) for users it has key material for. Emails sent to users indicating their key material expiry and validity include advertisements to derive revenue to support this public system. This embodiment results in what is called a public key server akin to those deployed by competing encrypted email system: Pretty Good Privacy (PGP) email. Though support for PGP is not built into the vast majority of deployed email clients, it can and is used globally with the help of public PGP key servers. The present invention has the advantages of simplified key publication (simply sending a signed email); and, by virtue of being based on S/MIME, automatic key material lookup built into majority of deployed email clients and keys that are validated to trusted sources.

The preferred embodiment should not be considered to exclude the wider claims of the present invention which include address book protocols other than LDAP or secure email protocols other than S/MIME.

REFERENCES

[1] Secure/Multipurpose Internet Mail Extensions (S/MIME) Version Message Specification https://datatracker.ietf.org/doc/html/rfc8551

[2] Lightweight Directory Access Protocol (LDAP): Technical Specification Road Map
https://datatracker.ietf.org/doc/html/rfc4510
[3] There are now 1.2 billion Office users and 60 million Office 365 commercial customers
https://www.windowscentral.com/there-are-now-1.2-billion-office-users-60-million-office-365-commercial-customers
[4] SMTP Security via Opportunistic DNS-Based Authentication of Named Entities (DANE) Transport Layer Security (TLS)
https://datatracker.ietf.org/doc/html/rfc7672
[5] Public-key cryptography
http://en.wikipedia.org/wiki/Public-key_cryptography
[6] Common email address books include Microsoft Global Address List (GAL)
https://docs.micrisoft.com/en-us/exchange/email-addresses-and-address-books/address-lists/address-lists?view=exchserver-2019
and Active Directory (uses LDAP to communicate)
https://en.wikipedia.org/wiki/Active_Directory
[7] Example of public LDAP server with internally managed key material. E-MAIL CONFIGURATION FOR USAGE OF THE DFN PKI LDAP DIRECTORY SERVICE
https://tu-dresden.de/zih/dienste/service-katalog/arbeitsumgebung/e_mail/pki/e_mail_ldap_dfn_pki?set_language=en
[8] Simple Mail Transfer Protocol
https://datatracker.ietf.org/doc/html/rfc5321#section-5.1
[9] PKCS #7: Cryptographic Message Syntax Version 1.5
https://datatracker.ietf.org/doc/html/rfc2315
Cryptographic Message Syntax (CMS)
https://datatracker.ietf.org/doc/html/rfc5652
[10] userCertificate format
https://docs.microsoft.com/en-us/openspecs/windows_protocols/ms-adls/d66d1662-0b4f-44ab-a4c8-e788f3ae39cf
[11] userSMIMECertificate format for Microsoft
https://docs.microsoft.com/en-us/openspecs/windows_protocols/ms-adls/ae06cc47-4276-9229-91e03573f6bc
and for Microsoft Exchange Address Book Object Protocol
https://docs.microsoft.com/en-us/openspecs/exchange_server_protocols/ms-oxoabk/2653a83f-ace5-4543-8908-d6557e2f6ed6

What is claimed:

1. A method for automatically collecting and distributing Secure/Multipurpose Internet Mail Extensions (S/MIME) key material needed for encrypted email exchange comprising: an email server for receiving S/MIME signed email messages from senders wishing to publish their key material; a program validating the signed email messages and extracting content and signature parts; the program dissecting signature part into constituent sender certificate, intermediate certificates, and content signature; storing the sender certificate in local database, indexed by sender email address, in form acceptable for Lightweight Database Access Protocol (LDAP) distribution; reassembling original signature constituents including content in form acceptable for LDAP distribution and storing result in local database indexed by sender email address; a LDAP server receiving requests for S/MIME key material from email clients; responding with key material for requested email address from local database if available; and forwarding requests for key material not contained in the local database to other instances through Domain Name System (DNS) lookup.

2. The method of claim 1, further comprising periodic scanning for expired key material in local database and notifying senders associated with key material of status.

3. The method of claim 2, further comprising limiting local database entries to those associated with senders from within the organization operating the service.

4. The method of claim 2, where the system is operated as a public service without limitations on sender's organization.

5. The method of claim 4, further comprising the inclusion of paid advertising material in status notifications.

* * * * *